United States Patent [19]

Tagawa et al.

[11] Patent Number: 5,276,549
[45] Date of Patent: Jan. 4, 1994

[54] OPTICAL TRANSMITTER INCLUDING RARE EARTH-DOPED FIBER

[75] Inventors: Kenji Tagawa; Shinya Inagaki; Keiko Takeda; Osamu Oyama, all of Kawasaki, Japan

[73] Assignee: Fujitsu Limited, Kawasaki, Japan

[21] Appl. No.: 945,134

[22] Filed: Sep. 15, 1992

[30] Foreign Application Priority Data

Sep. 20, 1991 [JP] Japan .................. 3-241160

[51] Int. Cl.$^5$ .................. H01S 3/14; G02B 6/00; G02F 1/09
[52] U.S. Cl. .................. 359/341; 359/281; 359/337; 372/6; 372/106
[58] Field of Search .............. 359/281, 337, 341, 345; 385/6; 356/351; 365/122; 372/6, 27, 106

[56] References Cited

U.S. PATENT DOCUMENTS

| | | | |
|---|---|---|---|
| 3,599,106 | 8/1971 | Snitzer | 359/341 |
| 4,178,073 | 12/1979 | Uchida et al. | 359/160 |
| 4,650,289 | 3/1987 | Kuwahara | 359/160 |
| 4,702,557 | 10/1987 | Beckman et al. | 359/281 |
| 4,757,268 | 7/1988 | Abrams et al. | 359/337 |
| 4,991,938 | 2/1991 | Buhren et al. | 359/281 |
| 5,005,175 | 4/1991 | Desurvire et al. | 372/6 |
| 5,048,030 | 9/1991 | Hiro et al. | 372/106 |

OTHER PUBLICATIONS

Matsumoto, T.; Electronics Letters, vol. 15, #20, Sep. 27, 1979, pp. 625-627.
Krasinski et al; IEEE J. Q. E., vol. 26, #5, May 1990, pp. 950-958.

Primary Examiner—Nelson Moskowitz

[57] ABSTRACT

A high-output optical transmitter including a rare earth-doped fiber. The optical transmitter includes a signal light source for outputting signal light having a first predetermined plane of polarization and a pumping light source for outputting pumping light having a second predetermined plane of polarization. The plane of polarization of the signal light from the signal light source is rotated 45 degrees by a Faraday rotator such that the plane of polarization of the signal light output from the Faraday rotator and the pumping light are perpendicular to each other. The signal light from the Faraday rotator and the pumping light from the pumping light source are polarization-coupled by a polarization coupler and the combined light is introduced into the rare earth-doped fiber.

5 Claims, 2 Drawing Sheets

OPTICAL TRANSMITTER INCLUDING RARE EARTH-DOPED FIBER

BACKGROUND OF THE INVENTION

1. Field of the Invention

The present invention generally relates to an optical transmitter for use in optical communication systems and, more particularly, to a high-power optical transmitter including a rare earth-doped fiber.

2. Description of the Related Art

An optical amplifier directly amplifying an optical signal as it is, without converting the optical signal into an electrical signal, is substantially bit rate-free and facilitates construction of a large-capacity system. Because of such features, intensive studies are now being made in various research institutions on the optical amplifier as one of the key devices in the optical communication system for future. As one of the types of such optical amplifier, there is an optical amplifier using an optical fiber, chiefly the core of which is doped with a rare earth element (such as Er, Nd, and Yb), hereinafter called "rare earth-doped fiber".

The optical fiber amplifier has such excellent characteristics that it provides high gain, its gain is not dependent on polarization, it produces low noise, and it incurs little connection loss at its connection with an optical fiber as a transmission line. Because of this, a high-power optical transmitter can be realized by using the optical fiber amplifier as the booster amplifier.

FIG. 1 is a block diagram of a conventional high-output optical transmitter provided with an optical fiber amplifier. Signal light from a signal light source 2 such as a laser diode is passed through an optical isolator 4 in the forward direction and led into a multiplexer 8. In the multiplexer 8, the signal light and pumping light from a pumping light source 6 such as a laser diode are multiplexed, and the signal light and the pumping light are introduced into a rare earth-doped fiber 10. The signal light amplified in the rare earth-doped fiber 10 is passed through an optical isolator 12 in the forward direction and transmitted over an optical transmission line, not shown.

According to the arrangement of the above optical transmitter, the signal light is amplified in the rare earth-doped fiber 10 on the principle of stimulated emission at the wavelength of the signal light by the pumping light and, therefore, a high-output optical transmitter is realized. However, there has been a problem with such conventional optical transmitter incorporating an optical fiber amplifier that its structure is complicated, though it can output signal light of high power.

SUMMARY OF THE INVENTION

Accordingly, an object of the present invention is to provide an optical transmitter, incorporating an optical fiber amplifier, which is simple in structure and capable of obtaining a signal light output of high power.

In accordance with an aspect of the present invention, there is provided an optical transmitter comprising: a signal light source for outputting signal light having a first predetermined plane of polarization; a pumping light source for outputting pumping light having a second predetermined plane of polarization; a first Faraday rotator for rotating 45 degrees the plane of polarization of the signal light from the signal light source, the plane of the polarization of the signal light output from the first Faraday rotator being arranged to be perpendicular to the second predetermined plane of polarization; a polarization coupler for polarization-coupling the signal light from the first Faraday rotator and the pumping light from the pumping light source and outputting the coupled light; and a rare earth-doped fiber into which the signal light and the pumping light from the polarization coupler are introduced.

Preferably, the optical transmitter further includes a second Faraday rotator for rotating 45 degrees the plane of polarization of the pumping light from the pumping light source. The first and second Faraday rotators are arranged such that the plane of polarization of the signal light output from the first Faraday rotator and the plane of polarization of the pumping light output from the second Faraday rotator are perpendicular to each other.

According to the present invention, the function of an optical isolator for the light from the signal light source, the function to polarization-couple the signal light and the pumping light, and the function to amplify the signal light by means of a rare earth-doped fiber are attained by a simple structure. Thus, a high-power optical transmitter simple in structure can be provided.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
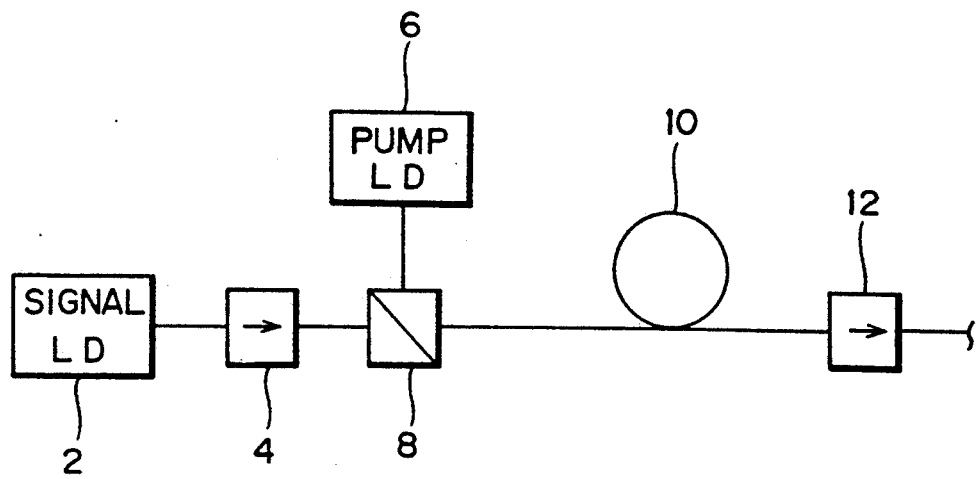
FIG. 1 is a schematic diagram explanatory of an example of conventional art.
Figure 2:
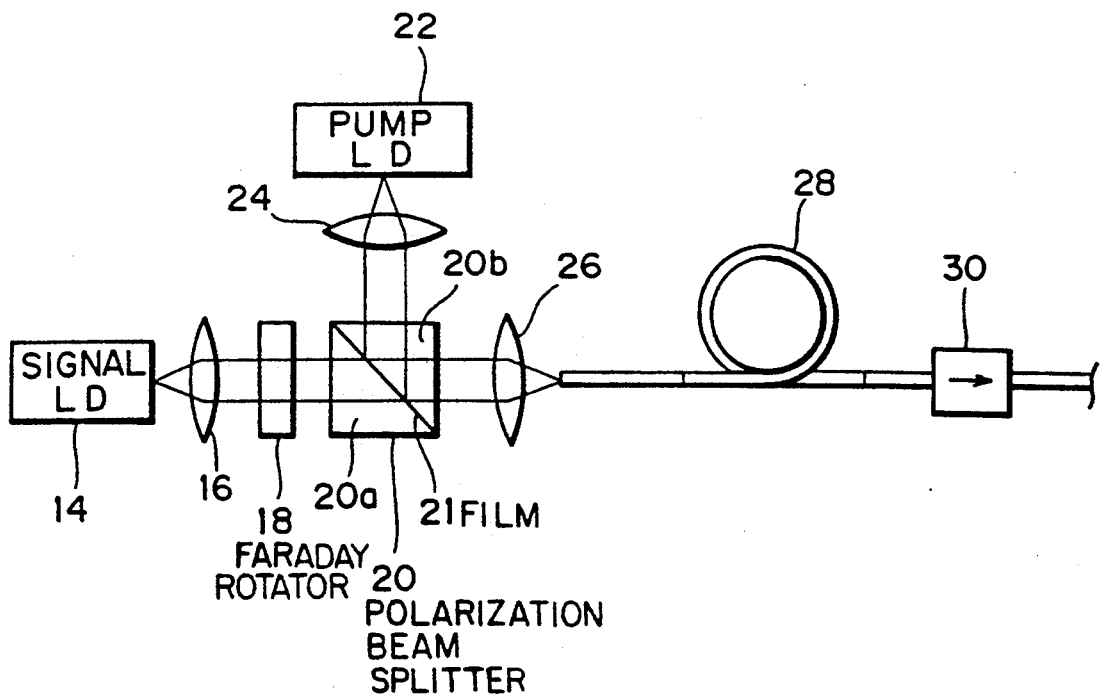
FIG. 2 is a structural diagram schematically showing an optical transmitter according to a first embodiment of the present invention.

First, an optical transmitter according to a first embodiment of the present invention will be described with reference to FIG. 2. Reference numeral 14 denotes a laser diode driven by a modulation circuit, not shown, and generating signal light with a wavelength of 1.55 $\mu$m. The signal light is turned into a collimated beam by a lens 16 and introduced into a Faraday rotator 18. The Faraday rotator 18 is constructed of a YIG crystal with a predetermined thickness having a predetermined strength of magnetic field applied in its signal light transmitting direction. This Faraday rotator 18 outputs signal light input thereto after rotating its plane of polarization by 45 degrees. If the plane of polarization of the signal light output from the Faraday rotator 18 is parallel with the surface of the paper, then the laser diode 14 is disposed such that the plane of polarization of the signal light output from the laser diode 14 is inclined at an angle of 45 degrees with the surface of the paper.

Reference numeral 22 denotes a pumping laser diode continuously driven by a suitable drive circuit and outputting pumping light with a wavelength of 1.48 $\mu$m. In the present embodiment, the pumping laser diode 22 outputs the pumping light having the plane of polarization perpendicular to the surface of the paper. The pumping light is turned into a collimated beam by a lens 24 and brought into a polarization beam splitter 20. The polarization beam splitter 20 is constructed of two rectangular prisms 20a and 20b with a polarization beam splitting film 21 provided by evaporation of a dielectric multilayer film on the interface.

The pumping light and the signal light from the Faraday rotator 18 are polarization-coupled in the polarization beam splitter 20. The polarization-coupled signal light and pumping light are converged by a lens 26 to be introduced into an erbium-doped fiber 28. The erbium-doped fiber 28 is formed by doping the core of a single mode fiber with erbium. When the pumping light with a wavelength of 1.48 μm propagates through the erbium-doped fiber 28, erbium ions are excited to a higher energy level. If, then, the signal light with the wavelength of 1.55 μm propagates through the erbium-doped fiber 28 whose erbium ions are excited to the higher energy level as described above, stimulated emission of radiation at the wavelength of the signal light takes place and, thereby, the signal light is progressively amplified as it travels along the erbium-doped fiber 28. The thus amplified signal light is transmitted over an optical transmission line through an optical isolator 30.

In the present embodiment, since the signal light and the pumping light are polarization-coupled and introduced into the erbium-doped fiber without using an optical isolator the signal light and the pumping light are hardly attenuated and efficient optical amplification can be achieved.

We now consider a light beam reflected from the input end face of the erbium-doped fiber 28 and the like and returning to the laser diode 14. Of the reflected and returning light beam introduced into the polarization beam splitter 20 through the lens 26, the component transmitted through the polarization beam splitter 20 is a beam having its plane of polarization parallel to the surface of the paper. The plane of polarization of the light beam transmitted through the polarization beam splitter 20 is rotated 45 degrees by the Faraday rotator 18. However, since the optical rotatory action of the Faraday rotator 18 is irreversible, the plane of polarization of the reflected and returning beam output from the Faraday rotator 18 and returning to the laser diode 14 through the Faraday rotator 18 crosses at a right angle with the plane of polarization of the signal light output from the laser diode 14. Accordingly, the laser diode 14 for outputting the signal light is virtually not affected by the reflected and returning beam. Thus, the function of an optical isolator is attained by the arrangement of the present embodiment. According to the present embodiment, an optical transmitter being simple in structure and outputting high power can be realized.

Figure 3:
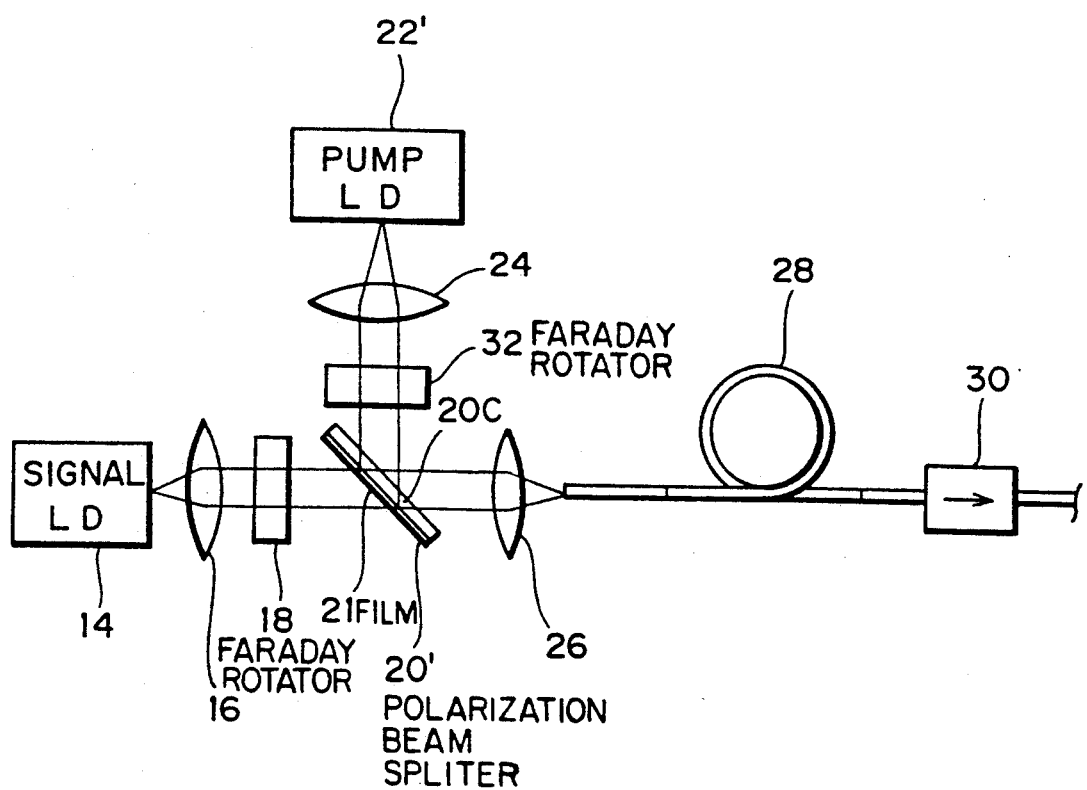
FIG. 3 is a structural diagram schematically showing an optical transmitter according to a second embodiment of the present invention.

Below will be described a second embodiment of the present invention with reference to FIG. 3. In this embodiment, in view of the possibility that the pumping light source is also adversely affected by the amplified signal light returning to the pumping light source, it is designed such that the function of an optical isolator for the pumping light is also attained.

While a polarization beam splitter 20 formed of two rectangular prisms 20a and 20b with a polarization beam splitting film 21 provided on their interface was used in the above described first embodiment, a polarization beam splitter 20' formed of a transparent substrate 20c with a polarization beam splitting film 21 formed on one surface of the transparent substrate 20c by evaporation is used in the present embodiment.

Between the lens 24 and the polarization beam splitter 20', there is disposed a Faraday rotator 32 similar to the Faraday rotator 18. The pumping laser diode 22' is arranged such that the plane of polarization of the pumping light output from the Faraday rotator 32 and introduced into the polarization beam splitter 20' comes to be perpendicular to the surface of the paper. More specifically, the plane of polarization of the pumping light emitted from the pumping laser diode 22' is inclined at an angle of 45 degrees with the surface of the paper. Since other arrangement than the above is the same as that in the above described first embodiment, description of the same will be omitted.

According to the arrangement of the present embodiment, the reflected and returning light beam reflected from the input end face of the erbium-doped fiber 28 and the like is partly reflected by the polarization beam splitter 20' to return to the pumping laser diode 22', but because its plane of polarization crosses at a right angle with the plane of polarization of the pumping light emitted from the pumping laser diode 22', the reflected and returning light does not adversely affect the pumping laser diode 22'.

What is claimed is:

1. An optical transmitter comprising:
a signal light source for outputting signal light having a first predetermined plane of polarization;
a pumping light source for outputting pumping light having a second predetermined plane of polarization;
a first Faraday rotator for rotating 45 degrees the plane of polarization of the signal light from said signal light source, said first Faraday rotator rotating a plane of polarization of a reflected and returning beam transmitting therethrough backwardly so that the plane of polarization of the reflected and returning beam output from said first Faraday rotator becomes perpendicular to the first predetermined plane of polarization;
a second Faraday rotator for rotating 45 degrees the plane of polarization of the pumping light from said pumping light source, said first and second Faraday rotators being arranged such that the plane of polarization of the signal light output from said first Faraday rotator and the plane of polarization of the pumping light output from said second Faraday rotator are perpendicular to each other, said second Faraday rotator rotating a plane of polarization of a reflected and returning beam transmitting therethrough backwardly so that the plane of polarization of the reflected and returning beam output from said second Faraday rotator becomes perpendicular to the second predetermined plane of polarization;
a polarization coupler for polarization-coupling the signal light from said first Faraday rotator and the pumping light from said second Faraday rotator and outputting the coupled light, said polarization coupler including a polarization beam splitting film transmitting both the signal light from said first Faraday rotator and a first component of the reflected and returning beam having a plane of polarization inclined at 45 degrees relative to the first predetermined plane of polarization and reflecting both the pumping light from said second Faraday rotator and a second component of the reflected and returning beam having a plane of polarization inclined at 45 degrees relative to the second predetermined plane of polarization, said polarization beam splitting film thus multiplexing the signal light and the pumping light and polarization splitting the reflected and returning beam; and a rare earth-doped fiber into which the signal light and the pumping light from said polarization coupler are introduced.

2. An optical transmitter according to claim 1, wherein said polarization coupler is a polarization beam splitting cube constructed of two rectangular prisms with a polarization beam splitting film formed of a dielectric multilayer film sandwiched therebetween.

3. An optical transmitter according to claim 1, wherein said polarization coupler is a polarization beam splitting plate constructed of a transparent substrate with a polarization beam splitting film made of a dielectric multilayer film formed on one side of the same.

4. An optical transmitter according to claim 1, wherein said rare earth-doped fiber is an erbium-doped fiber.

5. An optical transmitter according to claim 1, wherein said signal light has a wavelength of 1.55 $\mu$m and said pumping light has a wavelength of 1.48 $\mu$m.

* * * * *